Feb. 7, 1950         A. S. DUBUAR        2,496,622
TESTING CIRCUITS FOR DETERMINING
RELAY TIME INTERVALS
Filed Feb. 21, 1946
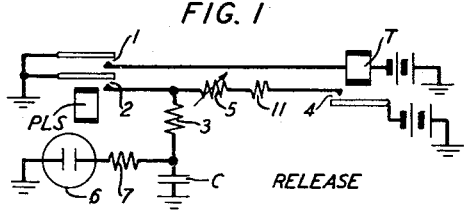
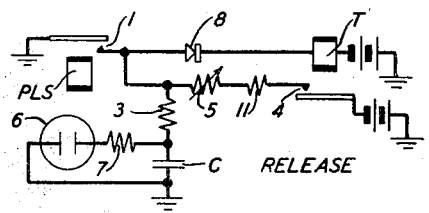
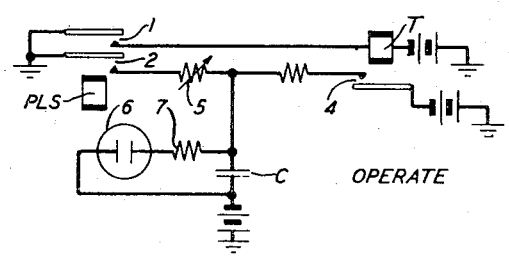
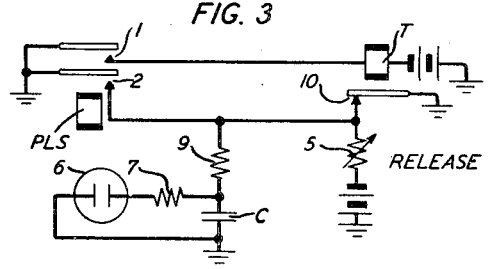
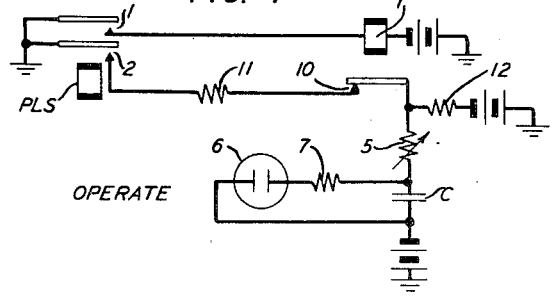
INVENTOR
A. S. DUBUAR
BY
ATTORNEY Patented Feb. 7, 1950

2,496,622

UNITED STATES PATENT OFFICE 2,496,622

TESTING CIRCUITS FOR DETERMINING RELAY TIME INTERVALS

Arthur S. Dubuar, East Orange, N. J., assignor to Bell Telephone Laboratories, Incorporated, New York, N. Y., a corporation of New York Application February 21, 1946, Serial No. 649,289

4 Claims. (Cl. 175—381)

This invention relates to testing arrangements and more particularly to test sets for accurately determining the elapsed times between the application of energizing potential to a relay, or its removal, and the subsequent operation or release of the relay. In other words, the invention relates to means for measuring the small time interval it takes a relay to operate or release after it has been energized or deenergized.

A feature of the invention resides in providing a circuit arrangement comprising a condenser, a space discharge glow lamp in shunt thereto, and an adjustable resistance, and in so associating said circuit with a source of potential and the energizing circuit and contacts of the relay under test that when the operate time of the relay is to be measured said potential source will start to build up a charge on the condenser simultaneously with the energization of the relay and stop said charge when the relay operates and when the release time of the relay is to be measured said condenser will receive a charge from said source in series with said resistance during the interval between the deenergization of the relay and its subsequent release, said resistance being adjusted, in either case, to such a value that the maximum potential charge given said condenser is just sufficient to fire said glow lamp, whereby the adjustment of said resistance is a measure of the respective operate or release times of said relay.

Another feature of the invention resides in insuring that the condenser is fully discharged before receiving a second charge either when the relay is reenergized following its release or deenergized following its operation.

The foregoing features may be briefly stated as means for charging a condenser in series with an adjustable resistance either when the relay under test is energized or deenergized and discontinuing the charge when the relay operates or releases, said condenser charge being restricted by adjustment of said resistance to a value which is just sufficient to cause a momentary discharge or flash of a gaseous discharge device connected in shunt to the condenser, the adjustment of the resistance under these conditions being the measure or indication of the operation or release time of the relay being tested.

The invention will be understood from the following description and appended claims when read in connection with the accompanying drawing in which:

Fig. 1 shows one arrangement for determining the release time of a relay following its deenergization;

Fig. 1A shows a modified arrangement for determining the release time;

Fig. 2 shows an arrangement for indicating the operate time of a relay following its energization;

Fig. 3 shows another arrangement for detecting the release time; and

Fig. 4 is another arrangement for determining the operate time of a relay.

Referring to the drawing, Fig. 1, a relay PLS or an equivalent switch is connected in any circuit where it will be successively operated and released at a substantially constant rate, as for example in a well-known pulsing circuit. This relay is provided with two armatures adapted to make two contacts 1 and 2, simultaneously. When relay PLS operates contacts 1 and 2 which close simultaneously and relay T, which is to be tested for its release time, will operate. Closure of contact 2 of relay PLS completes a circuit through resistance 3 to insure the complete discharge of any residual charge on condenser C. Operation of relay T at this time and the consequent closure of its contacts 4 is ineffective to charge condenser C due to the short-circuit on the condenser including resistance 3 and contact 2 of relay PLS. When relay PLS releases thus deenergizing relay T, a charge starts to build up on condenser C from battery, over contacts 4 of relay T, adjustable resistance 5, resistance 3 and condenser C to ground, which charge continues until relay T releases and its contact 4 opens.

If the resistance 5 is adjusted so that the condenser acquires a sufficient charge during the time the contacts 2 of PLS are open and contacts 4 of relay T are closed, a discharge tube 6 connected across the condenser will flash. Since resistance 5 controls the build up time of the charge on condenser C, a different adjustment will be necessary for different release times of relays under test to arrive at such a potential that the discharge tube will just flash. This adjustment can be calibrated in milliseconds to indicate directly the release time of the relay.

It will be noted that the charge time of condenser C is the interval between the time relay PLS releases and opens its contacts to deenergize relay T and the time contacts 4 of that relay open and hence this is the release time of relay T.

Resistance 7 is connected in series with tube 6 to protect the tube, and resistance 3 protects contact 2 of relay PLS when that relay reoperates and discharges condenser C. Resistance 11 in series with the adjustable resistance 5 is for the purpose of preventing short-circuiting the battery when contacts 2 and 4 are closed in case the resistance 5 should be accidentally reduced to zero.

In the arrangement of Fig. 1A, relay PLS is equipped with only one contact, i. e., (1) to serve the function performed by both contacts 1 and 2 of Fig. 1. To prevent the inductive discharge from relay T from firing tube 6 when relay PLS releases, a unidirectionally conducting device 8, such as a rectifier (varistor), is inserted in the operating circuit of relay T. This introduction of the rectifier inserts a resistance in series with relay T which might be less desirable than employing two contacts on relay PLS as shown in Fig. 1.

Fig. 2 shows a circuit arrangement to determine the operate time of relay T which also has a contact 4 which is closed when the relay operates.

When relay PLS or an equivalent switch operates, it closes its contacts 1 to energize relay T and also closes its contact 2 to charge condenser C over a circuit from ground, contact 2, adjustable resistance 5 and condenser C to battery and ground. When relay T operates, it closes its contacts 4 thus short-circuiting the condenser and causing it to discharge. By adjusting the resistance 5 so that the tube 6 just flashes before the condenser is short-circuited, the adjustment of the resistance 5 indicates the operate time of the relay.

Fig. 3 illustrates a circuit arrangement for determining the release time of a relay (T) which is equipped with contacts which open when the relay operates and close when it releases. When the relay PLS operates and closes its contacts 1 and relay T is energized which soon operates to open its contact 10 and when contacts 2 of relay PLS close a circuit is closed, including resistance 9, to insure that condenser C is fully discharged. When relay PLS releases thereby opening its contacts 2 and removing the short-circuit from condenser C, this condenser starts to receive a charge in a circuit from battery, adjustable resistance 5, resistance 9, condenser C to ground, during the interval contacts 10 of relay T remain open. When relay T releases and contacts 10 again close, the condenser C is short-circuited in a circuit from ground, contacts 10 of relay T, resistance 9, to the upper plate of the condenser.

Resistance 5 is adjusted as before until the tube 6 just flashes on each cycle of operation of relay PLS which adjustment indicates the release time of relay T.

Fig. 4 shows a further arrangement to determine the operate time of a relay, such as T, which is equipped with contacts 10 which open when the relay operates and close when the relay releases.

When relay PLS or an equivalent switch operates, closure of its contacts 1 energizes relay T and closure of contacts 2 initiates a charge on condenser C, during the interval before relay T operates and opens its contacts 10, which circuit is traced from ground, contacts 2 of relay PLS, resistance 11, contacts 10 of relay T, adjustable resistance 5, condenser C to battery and ground.

When relay T operates and opens its contacts 10, condenser C is short-circuited in the circuit from grounded battery, resistance 12, and adjustable resistance 5 to the upper plate of condenser C.

As before, resistance 5 is adjusted until the discharge tube 6 just flashes on each cycle of operation of relay PLS which adjustment indicates the operate time of relay T. When relay PLS releases the foregoing charging path is opened and a short-circuit then exists around the condenser to insure its complete discharge.

What is claimed is:

1. In a testing arrangement for determining the response delay time interval of a relay, a relay to be tested, an energizing circuit for said relay, a condenser, charge and discharge circuits for said condenser, a pair of simultaneously operable switches, one of said switches being in said energizing circuit for controlling said relay and the other one of said switches being in circuit with said condenser for simultaneously initiating a charge on said condenser through said charge circuit, means for successively opening and closing said switches so as to provide a series of delay time intervals, contacts included in and controlled by said relay and in circuit with said condenser to discontinue the charging of said condenser at the end of each delay time interval, said other one of said switches being arranged to automatically discharge said condenser between each of the delay time intervals, and means for measuring the charge accumulated on said condenser in terms of the charging time comprising an adjustable resistance in series with said condenser in said charge circuit and a glow discharge tube in shunt to said condenser.

2. In a testing arrangement for determining the response delay time interval of a relay, a relay to be tested, an energizing circuit for said relay, a condenser, charge and discharge circuits for said condenser, a pair of simultaneously operable switches, one of said switches being in said energizing circuit for controlling said relay and the other of said switches being in shunt to said condenser in said charge circuit to simultaneously initiate a charge on said condenser, contacts included in and controlled by said relay and in series with said condenser in said charge circuit to discontinue the charging of said condenser at the end of the delay time interval, and means for measuring the charge accumulated on said condenser in terms of the charging time comprising an adjustable resistance in series with said condenser in said charge circuit and a glow discharge tube in shunt to said condenser.

3. In a testing arrangement for determining the response delay time interval of a relay, a relay to be tested, an energizing circuit for said relay, a condenser, charge and discharge circuits for said condenser, a pair of simultaneously operable switches, one of said switches being in said energizing circuit for controlling said relay and the other of said switches being in series with said condenser in said charge circuit to simultaneously initiate a charge on said condenser, contacts included in and controlled by said relay and in shunt to said condenser in said charge circuit to discontinue the charging of said condenser at the end of the delay time interval, and means for measuring the charge accumulated on said condenser in terms of the charging time comprising an adjustable resistance in series with said condenser in said charge circuit and a glow discharge tube in shunt to said condenser.

4. In a testing arrangement for determining the response delay time interval of a relay, a relay to be tested, an energizing circuit for said relay, a condenser, charge and discharge circuits for said condenser, a pair of simultaneously operable switches, one of said switches being in said energizing circuit for controlling said relay and the other of said switches being in shunt to said condenser in said charge circuit to simultaneously initiate a charge on said condenser, contacts included in and controlled by said relay and in shunt to said condenser in said charge circuit to discontinue the charging of said condenser at the end of the delay time interval, and means for measuring the charge accumulated on said condenser in terms of the charging time comprising an adjustable resistance in series with said condenser in said charge circuit and a glow discharge tube in shunt to said condenser.

ARTHUR S. DUBUAR.

REFERENCES CITED

The following references are of record in the file of this patent:

UNITED STATES PATENTS

| Number | Name | Date |
| --- | --- | --- |
| 1,526,337 | Hartley | Feb. 17, 1925 |
| 1,561,225 | Fry | Nov. 10, 1925 |
| 1,765,585 | Herman | June 24, 1930 |
| 2,144,873 | Dimond | Jan. 24, 1939 |
| 2,369,619 | Stibitz | Feb. 13, 1945 |